United States Patent

[11] 3,540,779

| | | |
|---|---|---|
| [72] | Inventor | Guy Marouby<br>Neuilly, France |
| [21] | Appl. No. | 738,642 |
| [22] | Filed | June 20, 1968 |
| [45] | Patented | Nov. 17, 1970 |
| [73] | Assignee | Societe Anonyme D.B.A.<br>Paris, France |
| [32] | Priority | Oct. 6, 1967 |
| [33] | | France |
| [31] | | No. 123,622 |

[54] ANTISKID DEVICE FOR A VEHICLE BRAKING SYSTEM
2 Claims, 3 Drawing Figs.

| | | |
|---|---|---|
| [52] | U.S. Cl. | 303/21,<br>303/20 |
| [51] | Int. Cl. | B60t 8/08 |
| [50] | Field of Search | 303/20,<br>21A1, A4, BE, BB |

[56] References Cited
UNITED STATES PATENTS

| | | | |
|---|---|---|---|
| 3,026,148 | 3/1962 | Ruof | 303/21(BE) |
| 3,338,637 | 8/1967 | Harned et al. | 303/21(A1) |
| 3,398,995 | 8/1968 | Martin | 303/21(A4) |

*Primary Examiner*—Duane A. Reger
*Attorneys*—W. N. Antonis and Plante, Arens, Hartz and O'Brien ABSTRACT: An antiskid device for a vehicle braking system utilizing an electronic sensing unit for sensing the vehicle wheel speed and producing a speed signal which is proportional to wheel speed. From the speed signal is obtained an acceleration signal which is proportional to wheel acceleration or deceleration. The acceleration signal is processed so that its deceleration portion is reversed and its acceleration portion is highly amplified. The production of a control signal for decreasing or canceling the pressure in the vehicle braking system to prevent the wheels from locking up is initiated when the reversed deceleration portion of the acceleration signal reaches a predetermined value and is interrupted when the highly amplified acceleration portion of the acceleration signal reaches a predetermined value. The predetermined values are correlative to a predetermined threshold of wheel deceleration and to a predetermined threshold near the end of the wheel acceleration period but subsequent to the wheel deceleration period, respectively.

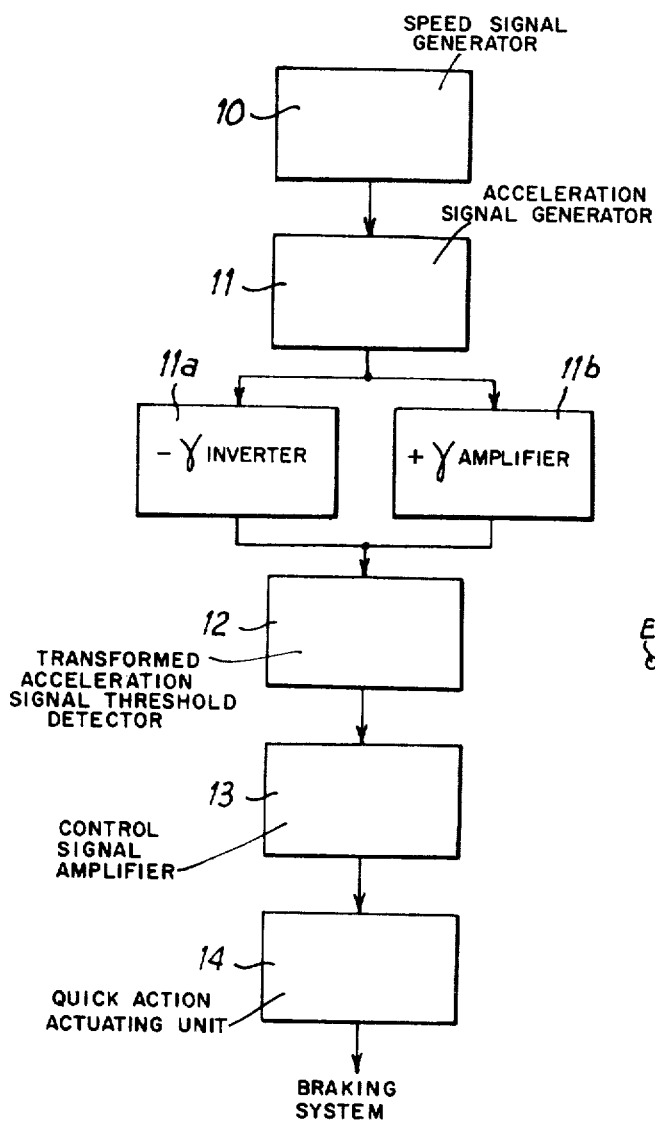
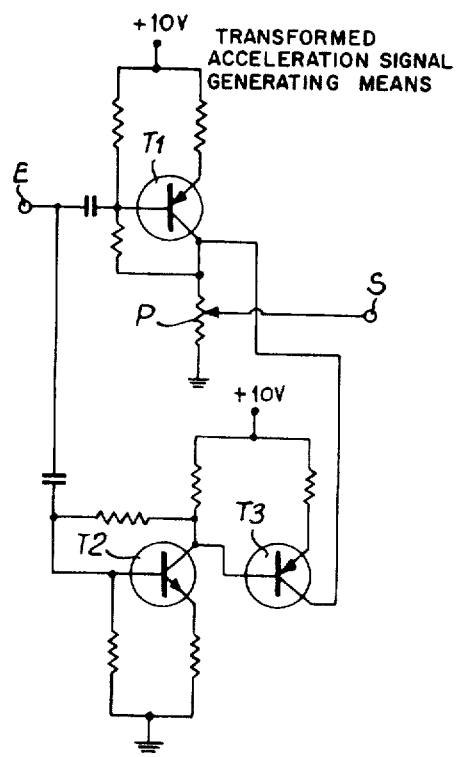

3,540,779

1

ANTISKID DEVICE FOR A VEHICLE BRAKING SYSTEM

CROSS REFERENCE TO RELATED APPLICATION

U.S. Pat. application Ser. No. 729,325, filed May 15, 1968 relates to the same field of the invention.

BACKGROUND OF THE INVENTION

An antiskid device, which is a device adapted to prevent the wheels to lock up during braking, is generally formed of a sensing unit and an actuating unit. The sensing unit is provided to sense a parameter related to braking so as to elaborate a control and then to address this control to the actuating unit which responds thereto by providing a decrease or cancellation of the braking action.

In the above-mentioned application it has been disclosed an antiskid device for a vehicle braking system which is formed of an electronic sensing unit for sensing the vehicle wheel speed and elaborating therefrom a control signal, and an actuating unit responding to said control signal for decreasing or canceling the pressure in the vehicle braking system, the electronic sensing unit comprising a speed signal generator for generating a speed signal which is proportional to wheel speed, an acceleration signal generator for generating from the speed signal and acceleration signal which is proportional to wheel deceleration or acceleration, and a deceleration threshold detector for generating the control signal which is responsive to a first value of the acceleration signal to initiate the production of the control signal and to a second value of the acceleration signal to interrupt the production of the control signal.

In one embodiment of the antiskid device disclosed in the above-mentioned application narrow pulses were produced from the acceleration signal, which pulses timely marked the beginning of the wheel deceleration, a first wheel deceleration threshold, a second wheel deceleration threshold, the crossing into acceleration of the wheel and the end of the wheel acceleration respectively. Among these narrow pulses, only those which were in time coincidence with the first wheel deceleration threshold and the end of the wheel acceleration were utilized to respectively initiate and interrupt the control signal which by means of one or several electrovalves of the actuating unit operated the latter to respectively produce in the braking system the decrease or cancellation of the pressure and the quick restoration thereof.

Although the above-mentioned embodiment has provided successful results, it might occur that narrow noise pulses be generated if the clearness of the speed signal, and therefore of the acceleration signal, left to be desired. Such noise pulses might be produced from a high residual pulsating component which would remain after the frequency-voltage conversion of the speed signal and give rise to a disturbed operation of the system, for example by unexpectedly initiating or interrupting the production or the cessation of the control signal.

SUMMARY OF THE INVENTION

According to the invention it is utilized for the production of the control signal a transformed acceleration signal which directly acts upon the control signal generating means.

It is therefore an object of the invention to provide an antiskid device for a vehicle braking system of the type disclosed in the above-mentioned application which does not rely upon narrow pulses for the production or the cessation of the control signal, so that the operation of the device cannot be disturbed by the accidental appearance of noise pulses.

BRIEF DESCRIPTION OF THE DRAWINGS

FIG. 1 represents in block form an antiskid device according to the present invention;
FIG. 3 is a schematic diagram of one embodiment of the circuits provided for inverting and amplifying the acceleration signal.

2

DESCRIPTION OF THE PREFERRED EMBODIMENT

Figure 2:
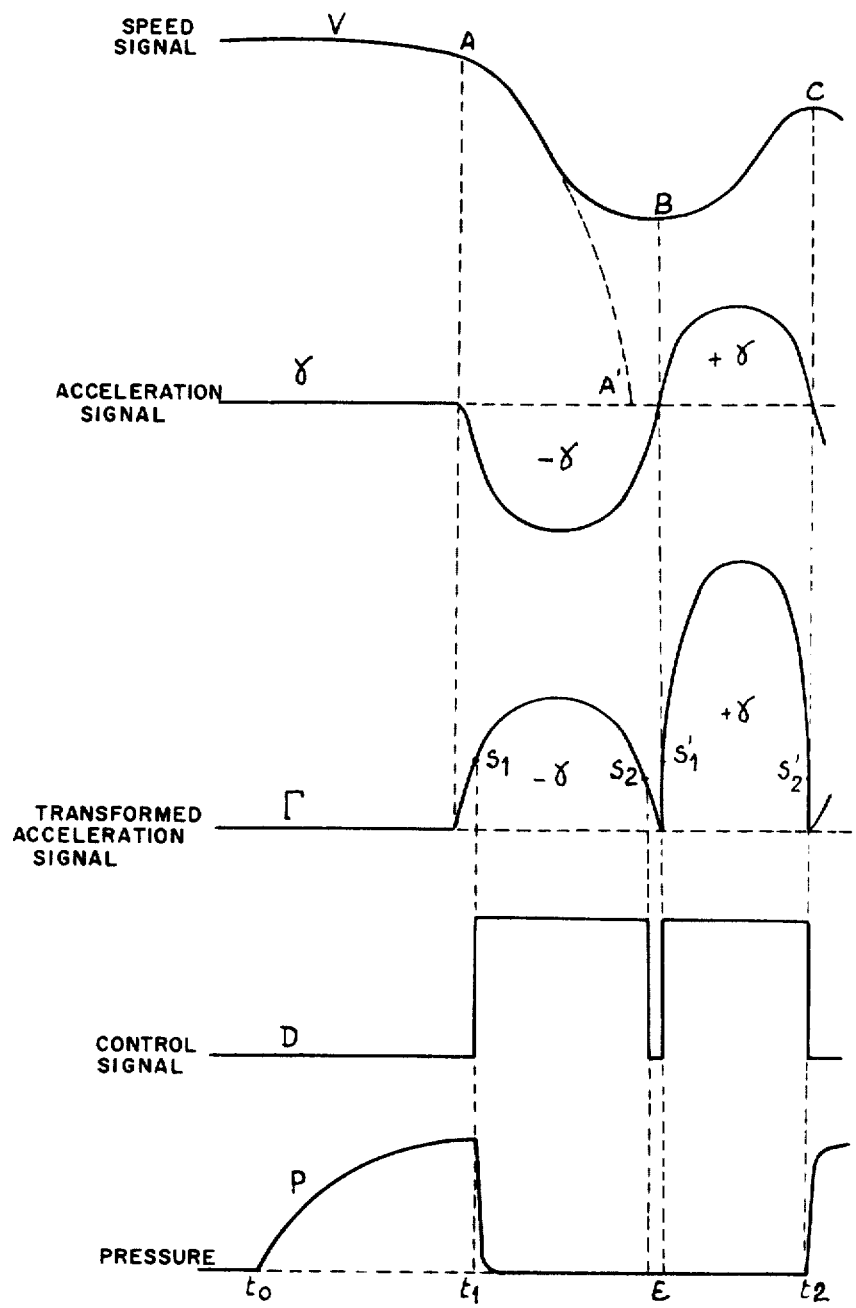
FIG. 2 represents diagrams relating to the operation of the device shown in FIG. 1.

Referring now to FIG. 1 of the drawings there is disclosed one embodiment of antiskid device comprising, on the one hand, a sensing unit formed of a speed signal generator 10, an acceleration (or deceleration) signal generator 11, an inverter 11a for the deceleration portion of the acceleration signal named $-\gamma$ inverter, an amplifier 11b for the acceleration portion of the acceleration signal named $+\gamma$ amplifier, a transformed acceleration signal threshold detector 12 and a control signal amplifier 13 and, on the other hand, a quickly acting actuating unit 14 the output of which acts upon the braking system.

The speed signal generator 10 senses the wheel speed and converts it into a signal voltage having a level correlative to wheel speed. The generator 10 may suitably be either a tachometric generator directly developing a signal voltage proportional to wheel speed or a variable reluctance alternating current type generator providing a signal having a frequency varying directly as the wheel speed and which is converted in a frequency-voltage converter into a signal voltage proportional to wheel speed.

The acceleration (or deceleration) signal generator 11 receives the speed signal and differentiates it so as to provide a signal voltage correlative to wheel deceleration or acceleration. The generator 11 comprises, for example, a conventional differentiating circuit to which it may be added one or several voltage amplifiers.

The $-\gamma$ inverter 11a is effective, for a purpose which will soon appear, to invert only the deceleration portion of the acceleration signal, and the $+\gamma$ amplifier 11b is adapted, for a purpose which will also soon appear, to highly amplify only the acceleration portion of the acceleration signal.

The threshold detector 12 receives the transformed acceleration signal and develops a control signal as soon as the deceleration portion of the transformed acceleration signal exceeds a level corresponding to a predetermined wheel deceleration threshold. The detector 12 may be constituted by a Schmitt trigger which is switched from its initial stable condition into its second stable condition as soon as the transformed acceleration signal reaches a predetermined level and which is again switched into its initial stable condition when the level of the transformed acceleration signal becomes slightly lower than the said predetermined level. The Schmitt trigger develops a control signal as long as it remains in its second stable condition.

The control signal provided by the threshold detector 12 is amplified in the amplifier 13 which may be a conventional direct-coupled amplifier, and the amplified control signal is applied to the actuating unit 14 where it is utilized to operate one or several electrovalves so that this unit controls the pressure in the braking system.

Reference is now made to FIG. 2 of the drawings for an explanation of the operation of the just described embodiment. The curve V represents the speed signal provided by the generator 10 and corresponds to the linear wheel speed. The curve $\gamma$ represents the acceleration signal provided by the generator 11 and corresponds to the linear wheel deceleration ($-\gamma$) and then the linear wheel acceleration ($+\gamma$). The curve $\Gamma$ represents the transformed acceleration signal which is a combination of the signals from the $-\gamma$ inverter 11a and the $+\gamma$ amplifier 11b. The portion $-\gamma$ of the curve $\Gamma$ included between the points of abscissa A and B corresponds to the inverted deceleration portion of the acceleration signal and the portion $+\gamma$ of the curve $\Gamma$ included between the points of abscissa B and C corresponds the the amplified acceleration portion of the acceleration signal. The curve D represents, after amplification, the control signal provided by the threshold detector 12 and the curve P represents the pressure in the braking system.

The pressure (curve P) in the braking system is applied at an instant $t_0$. A short time interval later, at A on the curve V, the wheel speed begins to decrease and, if the antiskid device according to the invention were not provided and if the vehicle driver continued to maintain the pressure in the braking system, the wheel speed would decrease along the branch AA' and the wheel lockup would be reached at A'. However, thanks to the antiskid device, as soon as the wheel deceleration reaches at an instant $t_1$ a predetermined threshold value, the transformed acceleration signal reaches the triggering level of the threshold detector 12 (at $S_1$ on curve Γ), and this triggers the threshold detector 12 which then instantaneously develops a control signal (curve D) which operates the actuating unit 14 by means of one or several electrovalves thereof so that this unit reduces or cancels the pressure in the braking system. Once the wheel deceleration has reached a maximum value, the wheel speed decreases more slowly and the wheel deceleration decreases and passes through a second predetermined threshold value while the transformed acceleration signal then falls to the interrupting level of the threshold detector 12 (at $S_2$ on curve Γ), and this interrupts the production of the control signal. After a very short time interval $\epsilon$, the wheel speed ceases from decreasing (at B on curve V) and then begins to increase until a maximum value is reached (at C on curve V). The wheel speed rapidly increases for the initial portion of the branch BC of the curve V, passes through a maximum value and then less rapidly increases for the remaining portion of the branch BC, so that the wheel acceleration firstly increases, passes through a maximum value and then decreases until it reaches a nil value. Accordingly, when the wheel acceleration increases, the transformed acceleration signal reaches again the triggering level of the threshold detector 12 (at $S_1'$ on curve Γ) and triggers the threshold detector 12 which instantaneously generates again the control signal. Then, when the wheel acceleration decreases, the transformed acceleration signal falls to the interrupting level of the threshold detector 12 (at $S_2'$ on curve Γ), and this interrupts the production of the control signal, so that the actuating unit quickly restores at an instant $t_2$ the pressure in the braking system. As soon as the wheel deceleration reaches again the predetermined threshold value (corresponding to $S_1$ on curve Γ), the cycle repeats itself.

The operation which has been just described calls for three remarks.

a. Since the threshold detector 12, due to its design, is only responsive to a unidirectional signal, this is the reason why the deceleration portion (−γ) of the acceleration signal has been inverted in the −γ inverter 11a. In this manner, the deceleration and acceleration portions of the transformed acceleration signal have the same polarity.

b. By highly amplifying in the +γ amplifier 11b, as previously mentioned, the acceleration portion (+γ) of the acceleration signal, it is obtained for the acceleration portion of the transformed acceleration signal a waveform having extremely steep leading and trailing edges which, for this reason, may be practically confounded, at the levels of the threshold values $S_1'$ and $S_2'$, with the vertical lines respectively issued from the point B and the point C. Due to this fact, the control signal reappears when the wheel speed ceases from decreasing (at B on curve V) and is interrupted when the wheel speed has reached a maximum value (at C on curve V).

c. Since the reappearance of the control signal practically takes place when the wheel speed ceases from decreasing (at B on curve V), the time interval $\epsilon$ of interruption of the control signal is extremely short (actually shorter than it appears from the drawing which to clearly show the interrupting split did not respect the scale) and lower than the response time of the actuating unit 14, so that everything practically happens as if the control signal would not have been interrupted.

According to the described embodiment, it is therefore when the wheel has reached again a maximum speed, i.e. at C on the curve V, that the control signal is really interrupted so as to allow a quick restoration of the pressure in the braking system. Since the time interval between points A and C is a function of the wheel grip with the road surface, the intervening time of the actuating unit 14, during which the pressure is reduced or canceled in the braking system, is thus variable and proportional to the road surface conditions. In this manner, this embodiment permits to optimalize the action of the braking system.

One embodiment of the −γ inverter 11a and the +γ amplifier 11b is shown in FIG. 3. The acceleration signal is applied to the input terminal E and is addressed, on the one hand, to the base electrode of a transistor $T_1$ of the PNP type which constitutes with the associated components the −γ inverter 11a and, on the other hand, to the base electrode of transistor $T_2$ of the NPN type which forms with a transistor $T_3$ of the PNP type and the associated components the +γ amplifier 11b. The transistor $T_1$ is only responsive to negative input signals while the transistor $T_2$ is only responsive to positive input signals. The collector electrodes of the transistors $T_1$ and $T_3$ are connected together and the transformed acceleration signal appearing at the output terminal S is derived from a potentiometer P inserted in the collector circuit of the transistor $T_1$. The potentiometer P is provided for adjusting the level of the transformed acceleration signal and thus for choosing the optimum operating level which produces the best triggering action for the threshold detector.

In addition to the two circuits which have been just briefly described, all the components of the sensing unit represented in FIG. 1 are transistorized and therefore this unit is not energy consuming and can be made in the form of a compact structure which may be placed in any suitable location.

It should be obvious from the description of the preferred embodiment that an antiskid device could be provided for each braked wheel or for each pair of braked wheels, for instance the rear pair and the front pair. Also, it should be understood that the antiskid device is only operated when the brake pedal is utilized, in a manner for example of the energization of a stoplight. One skilled in the art can make certain other changes and modifications without departing from the teachings and the scope of the invention as defined by the following claims.

I claim:

1. An antiskid device for a vehicle braking system comprising an electronic sensing unit for sensing the vehicle wheel speed and producing therefrom a control signal, and an actuating unit responding to said control signal for decreasing the pressure in the vehicle braking system, said electronic sensing unit comprising means for generating a speed signal which is proportional to wheel speed, means for generating from said speed signal an acceleration signal which is proportional to wheel acceleration, and means selectively responsive to said acceleration signal for generating said control signal in which there is provided means for reversing only the deceleration portion of said acceleration signal and means for highly amplifying only the acceleration portion of said acceleration signal, said selective responsive means being responsive to a predetermined value of the reversed deceleration portion of said acceleration signal to initiate the production of said control signal and to a predetermined value of the highly amplified acceleration portion of said acceleration signal to interrupt the production of said control signal.

2. An antiskid device as claimed in claim 1 wherein said predetermined value of the reversed deceleration portion of said acceleration signal is correlative to a first predetermined threshold of wheel deceleration, and said predetermined value of the highly amplified acceleration portion of said acceleration signal is substantially correlative to the end of the wheel acceleration period which follows the wheel deceleration period.